UNITED STATES PATENT OFFICE.

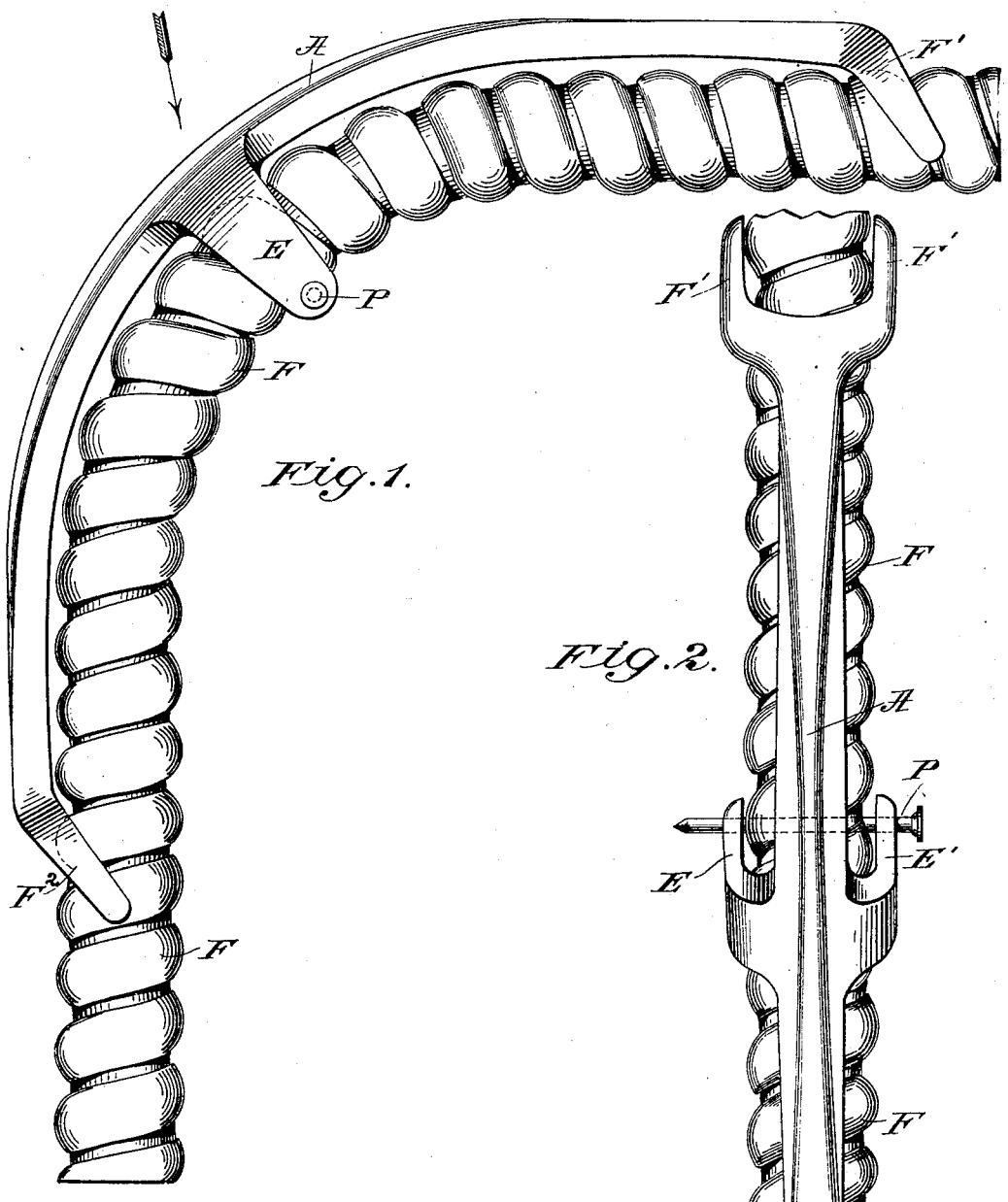

EDWIN T. GREENFIELD, OF NEW YORK, N. Y.

MEANS FOR GIVING RIGIDITY TO ELBOWS OR TURNS OF FLEXIBLE CONDUITS.

SPECIFICATION forming part of Letters Patent No. 644,858, dated March 6, 1900.

Application filed December 18, 1899. Serial No. 740,686. (No model.)

*To all whom it may concern:*

Be it known that I, EDWIN T. GREENFIELD, a citizen of the United States, residing at New York, borough of Manhattan, county and State of New York, have made a new and useful Invention in Means for Giving Rigidity to the Elbows or Turns of Flexible Conduits, of which the following is a specification.

My invention will be fully understood by referring to the accompanying drawings, in which—

Figure 1 is a plan view illustrating its application to a flexible conduit, and Fig. 2 is a side elevational view as seen looking at Fig. 1 from the upper left-hand corner of the drawings in the direction of the arrow.

In the installing in buildings of flexible armored electrical conduits and electrical cables like those disclosed in United States Patents No. 593,842, for a flexible armored conduit, and No. 616,612, for armored electric cables, granted to me, respectively, on the 16th day of November, 1897, and 27th day of December, 1898, it is necessary to give to the elbows or turns of such flexible conduits or cables permanent or fixed rigidity in order that the conductors may be drawn therein with as little annoyance as possible; and to this end my invention was devised and consists of a rigid metallic yoke or elbow which holds the curved conduit or cable firmly in a definite or fixed position.

Referring to the drawings in detail, F represents a flexible metallic armored conduit or cable like that disclosed in my before-mentioned patents.

A represents my novel means for holding or securing the elbow or turn of such a conduit in a fixed or rigid manner, said means consisting, preferably, of a curved iron yoke having forks $F'$ $F^2$ at its opposite ends and inwardly-extending ears E E' near its center, P being a pin adapted to extend through openings in the ears E E'.

In using this device the conduit is sprung into place between the forked ends $F'$ $F^2$ and the centrally-located ears E E', after which a soft-iron nail or pin P is put in place in the openings in the outer ends of the ears E E' and driven therethrough into the face of the wall or supporting-surface, thus giving to the conduit the desired rigid curvature and support.

I do not limit myself to the especial form of device herein shown and described for giving to a flexible armored conduit or cable a rigid elbow or turn, as I believe I am entitled to claim, broadly, a rigid curvilinear device adapted to hold or secure a flexible armored conduit or cable in a definite curved position.

Having thus described my invention, what I claim, and desire to secure by Letters Patent of the United States, is—

1. A rigid curvilinear holding device adapted to hold a flexible armored conduit or cable rigidly in a curved position, substantially as described.

2. A rigid curvilinear holding device for a flexible armored conduit or cable having means at its opposite ends, together with means between said ends for securing it in position and giving to the armored conduit or cable a definite rigid curvature, substantially as described.

3. A rigid curvilinear holding device for a flexible armored conduit or cable provided with forks at its opposite ends, and intermediate means for securing it in position and giving to the armored conduit or cable a definite rigid curvature, substantially as described.

4. A rigid curvilinear holding device for a flexible armored conduit or cable provided with means for securing it to the face of a wall or other supporting-surface, substantially as described.

In testimony whereof I have hereunto subscribed my name this 15th day of December, 1899.

EDWIN T. GREENFIELD.

Witnesses:
WM. T. RUETE,
C. J. KINTNER.